US011935490B2

(12) United States Patent
Pyo et al.

(10) Patent No.: US 11,935,490 B2
(45) Date of Patent: Mar. 19, 2024

(54) DISPLAY DEVICE

(71) Applicant: SAMSUNG DISPLAY CO., LTD., Yongin-si (KR)

(72) Inventors: Si-Beak Pyo, Cheonan-si (KR); Won-Ju Shin, Cheonan-si (KR); Kyung-Ho Hwang, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 7 days.

(21) Appl. No.: 17/931,112

(22) Filed: Sep. 9, 2022

(65) Prior Publication Data

US 2023/0005438 A1 Jan. 5, 2023

Related U.S. Application Data

(60) Continuation of application No. 17/182,037, filed on Feb. 22, 2021, now Pat. No. 11,443,700, which is a (Continued)

(30) Foreign Application Priority Data

Oct. 28, 2015 (KR) ........................ 10-2015-0149928

(51) Int. Cl.
*G09G 3/3291* (2016.01)
*G09G 3/3233* (2016.01)
*G09G 3/3258* (2016.01)

(52) U.S. Cl.
CPC ......... *G09G 3/3291* (2013.01); *G09G 3/3233* (2013.01); *G09G 3/3258* (2013.01); (Continued)

(58) Field of Classification Search
CPC .. G09G 3/3291; G09G 3/3233; G09G 3/3258; G09G 2300/0819; (Continued)

(56) References Cited

U.S. PATENT DOCUMENTS 6,839,048 B2 * 1/2005 Park ..................... G09G 3/3648 345/89
7,042,427 B2 5/2006 Inukai
(Continued)

FOREIGN PATENT DOCUMENTS

CN 103198779 A 7/2013
EP 2557560 A2 2/2013
(Continued)

OTHER PUBLICATIONS

Chinese Intellectual Property Office Action for corresponding Chinese Patent Application No. 201610969275.5, dated Sep. 29, 2020, 12 pages.
(Continued)

*Primary Examiner* — Bryan Earles
(74) *Attorney, Agent, or Firm* — Lewis Roca Rothgerber Christie LLP

(57) ABSTRACT

A display device includes a display panel including a gate line, a data line, and a pixel at a crossing region of the gate line and the data line, a timing controller configured to generate a gate driving control signal, a data driving control signal, and a power control signal based on a display period corresponding to a time interval of frames, a gate driver configured to provide a gate signal to the pixel through the gate line based on the gate driving control signal, a data driver configured to provide a data signal to the pixel through the data line based on the data driving control signal, and a power supply configured to generate a power voltage to drive the pixel, and configured to adjust the power voltage based on the power control signal during the display period.

15 Claims, 12 Drawing Sheets

Related U.S. Application Data continuation of application No. 16/534,670, filed on Aug. 7, 2019, now Pat. No. 10,930,222, which is a division of application No. 15/294,611, filed on Oct. 14, 2016, now Pat. No. 10,424,255.

(52) U.S. Cl.
CPC ............... *G09G 2300/0819* (2013.01); *G09G 2300/0842* (2013.01); *G09G 2300/0861* (2013.01); *G09G 2310/0286* (2013.01); *G09G 2310/08* (2013.01); *G09G 2320/0233* (2013.01); *G09G 2320/0242* (2013.01); *G09G 2320/0247* (2013.01); *G09G 2320/045* (2013.01); *G09G 2330/021* (2013.01); *G09G 2340/0435* (2013.01)

(58) Field of Classification Search
CPC ... G09G 2300/0842; G09G 2300/0861; G09G 2310/0286; G09G 2310/08; G09G 2320/0233; G09G 2320/0242; G09G 2320/0247; G09G 2320/045; G09G 2330/021; G09G 2340/0435; G09G 3/3225
See application file for complete search history.

(56) References Cited

U.S. PATENT DOCUMENTS

| | | | | |
|---|---|---|---|---|
| 7,274,363 | B2 | 9/2007 | Ishizuka et al. | |
| 7,286,125 | B2 * | 10/2007 | Morita | G09G 3/3688 345/212 |
| 8,836,734 | B2 | 9/2014 | Mori et al. | |
| 9,135,880 | B2 | 9/2015 | Koyama | |
| 9,208,718 | B2 | 12/2015 | Pyo | |
| 9,318,069 | B2 | 4/2016 | Nambi et al. | |
| 9,767,747 | B2 * | 9/2017 | Oh | G09G 5/006 |
| 9,952,642 | B2 | 4/2018 | Wang et al. | |
| 10,365,680 | B2 * | 7/2019 | Ripley | H04B 1/40 |
| 2002/0093473 | A1 | 7/2002 | Tanaka et al. | |
| 2003/0067289 | A1 * | 4/2003 | Morita | G09G 3/3611 323/282 |
| 2006/0071896 | A1 * | 4/2006 | Nakata | G09G 3/20 345/94 |
| 2007/0126672 | A1 | 6/2007 | Tada et al. | |
| 2007/0247214 | A1 * | 10/2007 | Lin | H02M 3/07 327/536 |
| 2008/0106542 | A1 | 5/2008 | Park et al. | |
| 2008/0252628 | A1 | 10/2008 | Han et al. | |
| 2011/0018858 | A1 | 1/2011 | Ryu et al. | |
| 2013/0038621 | A1 | 2/2013 | Choi et al. | |
| 2013/0082910 | A1 | 4/2013 | Lee | |
| 2013/0127929 | A1 | 5/2013 | Isobe et al. | |
| 2013/0169693 | A1 | 7/2013 | Pyo | |
| 2013/0194316 | A1 | 8/2013 | Park et al. | |
| 2014/0125714 | A1 | 5/2014 | Pyo | |
| 2015/0097764 | A1 | 4/2015 | Pyo et al. | |
| 2015/0138251 | A1 | 5/2015 | Pyo | |
| 2015/0279274 | A1 | 10/2015 | Pyo | |
| 2015/0287352 | A1 | 10/2015 | Watanabe et al. | |
| 2015/0348505 | A1 | 12/2015 | Pyo | |
| 2015/0364089 | A1 | 12/2015 | Pyo et al. | |
| 2016/0189616 | A1 | 6/2016 | Oh et al. | |
| 2016/0210919 | A1 | 7/2016 | Nakanishi et al. | |

FOREIGN PATENT DOCUMENTS

| | | | |
|---|---|---|---|
| JP | 10-111490 | A | 4/1998 |
| JP | 2002-304156 | A | 10/2002 |
| JP | 2008-33066 | A | 2/2008 |
| KR | 10-2013-0018493 | A | 2/2013 |
| KR | 10-2015-0056940 | A | 5/2015 |
| KR | 10-2015-0139014 | A | 12/2015 |
| TW | 201225045 | A1 | 6/2012 |

OTHER PUBLICATIONS

EPO Partial Search Report dated Feb. 16, 2017, for corresponding European Patent Application No. 16196444.0 (9 pages).

Japanese Office Action dated Apr. 28, 2020, for corresponding Japanese Patent Application No. 2016-097707 (6 pages).

* cited by examiner

DISPLAY DEVICE

CROSS-REFERENCE TO RELATED APPLICATIONS

This application is a continuation of U.S. patent application Ser. No. 17/182,037, filed Feb. 22, 2021, which is a continuation of U.S. patent application Ser. No. 16/534,670, filed Aug. 7, 2019, now U.S. Pat. No. 10,930,222, which is a divisional of U.S. patent application Ser. No. 15/294,611, filed Oct. 14, 2016, now U.S. Pat. No. 10,424,255, which claims priority to, and the benefit of, Korean Patent Application No. 10-2015-0149928, filed on Oct. 28, 2015 in the Korean Intellectual Property Office (KIPO), the content of all of which is incorporated herein in their entirety by reference.

BACKGROUND

1. Field

Example embodiments relate to a display device that is driven with a low frequency.

2. Description of the Related Art

A display device displays an image based on input image data. When the display device displays the same image (e.g., a still image) for extended periods of time, a method of driving the display device can reduce power consumption by driving the display device with a low frequency (or, with a relatively low frequency). However, when the display device is driven with low frequency, a scan operation of the display device according to the low frequency (or, a relatively slow refresh rate of a screen of the display device) may be noticeable to a user, or a luminance drop, which occurs during a refresh time of the screen of the display device, may be noticed by the user.

SUMMARY

Some example embodiments provide a display device to compensate a luminance drop when the display device is driven with a relatively low frequency.

Some example embodiments provide a display device to reduce power consumption when the display device is driven with a relatively low frequency.

According to example embodiments, a display device includes a display panel including a gate line, a data line, and a pixel at a crossing region of the gate line and the data line, a timing controller configured to generate a gate driving control signal, a data driving control signal, and a power control signal based on a display period corresponding to a time interval of frames, a gate driver configured to provide a gate signal to the pixel through the gate line based on the gate driving control signal, a data driver configured to provide a data signal to the pixel through the data line based on the data driving control signal, and a power supply configured to generate a power voltage to drive the pixel, and configured to adjust the power voltage based on the power control signal during the display period.

The timing controller may be configured to select one of a plurality of display periods of different lengths as the display period based on input image data.

Each of the display periods may correspond to a responsiveness of a user for a corresponding image.

The timing controller may be configured to calculate an on-pixel ratio corresponding to the input image data, determine whether an input image corresponds to a special image when the on-pixel ratio is within a reference range, and select a third display period among the plurality of display periods when the input image corresponds to the special image.

The timing controller may be configured to determine whether an input image corresponds to a video, or corresponds to a still image, based on the input image data, select a first display period among the plurality of display periods when the input image corresponds to the video, and select a second display period among the plurality of display periods, which is greater than the first display period, when the input image corresponds to the still image.

The display period may include a plurality of frame times, the timing controller may be configured to generate a mask signal that has a logic low level during a frame time among the plurality of frame times, and that has a logic high level during a remainder of frame times among the plurality of frame times, and the frame time may be an amount of time to display one frame.

The gate driver may be configured to provide the gate signal to the pixel based on the mask signal during the frame, and is configured to stop providing the gate signal to the pixel based on the mask signal during the remainder of frame times.

The timing controller may be configured to generate the power control signal based on a luminance profile that includes information of luminance change over time during the display period.

The power supply may be configured to gradually vary the power voltage based on the power control signal.

The display device may further include a current sensor configured to measure a total current provided form the power supply to the display panel, and the timing controller may be configured to generate the power control signal based on a change of the total current.

The timing controller may be configured to calculate a reduced ratio of the total current with time during the display period, and generate the power control signal to adjust the power voltage based on the reduced ratio of the total current.

The power voltage may include a high power voltage and a low power voltage, and the power supply may be configured to gradually reduce a voltage level of the low power voltage during the display period based on the power control signal.

The power voltage may include a high power voltage and a low power voltage, and the power supply may be configured to gradually increase a voltage level of the high power voltage during the display period based on the power control signal.

The pixel may include sub-pixels, the power supply may be configured to generate sub power voltages to provide to the sub-pixels, and the timing controller may be configured to generate sub power control signals based on sub luminance profiles of the sub power voltages.

The display device may further include a light emission driver configured to generate a light emission control signal to control an off-duty ratio of the pixel, and configured to adjust the off-duty ratio, which represents a ratio of light non-emission time of the pixel to light emission time of the pixel, based on the display period.

The light emission driver may be configured to calculate the off-duty ratio based on input image data, and may be configured to gradually reduce the off-duty ratio during the display period.

According to example embodiments, a display device includes a display panel including a gate line, a data line, a light emission control line, and a pixel at a crossing region of the gate line, the data line, and the light emission control line, a gate driver configured to provide a gate signal to the pixel through the gate line, a data driver configured to provide a data signal to the pixel through the data line, a timing controller configured to determine a display period corresponding to a time interval of frames, and a light emission driver configured to provide a light emission control signal to the pixel through the light emission control line to control an off-duty ratio of the pixel, and configured to adjust the off-duty ratio, which represents a ratio of light non-emission time of the pixel to light emission time of the pixel, based on the display period.

According to example embodiments, a display device ay includes a display panel including a gate line, a data line, a power line, and a pixel at a crossing region of the gate line, the data line, and the power line, a timing controller configured to generate a gate driving control signal, a data driving control signal, a second power control signal, and a switch control signal based on a display period representing a time interval of frames, a driving circuit configured to provide a gate signal to the pixel through the gate line based on the gate driving control signal, and configured to provide a data signal to the pixel through the data line based on the data driving control signal, and a power supply configured to generate a power voltage to drive the pixel, and configured to provide the power voltage to the pixel through the power line, wherein the driving circuit includes a charging pump unit configured to generate a secondary power voltage to be adjusted with time during the display period in response to the second power control signal, and a power selecting unit configured to connect the power line to the power supply or the charging pump unit based on the switch control signal.

The power selecting unit may include a first switch configured to connect the power line with the power supply, and a second switch configured to connect the power line with the charging pump unit.

The timing controller may be configured to determine whether an input image corresponds to a still image based on input image data, and may be configured to generate a first switch control signal to turn off the first switch, and to turn on the second switch, when the input image corresponds to the still image.

Therefore, a display device according to example embodiments may compensate a luminance drop by determining a display period based on input image data, and by changing (e.g., adjusting or varying) a power voltage and an off-duty ratio (e.g., a light non-emission time) of a pixel based on the display period. In addition, the display device may improve accuracy of compensating luminance by measuring a total current provided to a display panel, and by changing/adjusting/varying the power voltage or the off-duty ratio based on a measured total current.

Furthermore, the display device according to example embodiments may control the power voltage more easily, and may reduce power consumption by providing the display panel with a secondary power voltage (e.g., an adjusted secondary power voltage) that is generated by the driving circuit instead of the power voltage generated by a power supply or by an external component.

BRIEF DESCRIPTION OF THE DRAWINGS

Illustrative, non-limiting example embodiments will be more clearly understood from the following detailed description taken in conjunction with the accompanying drawings.

DETAILED DESCRIPTION

Figure 1:
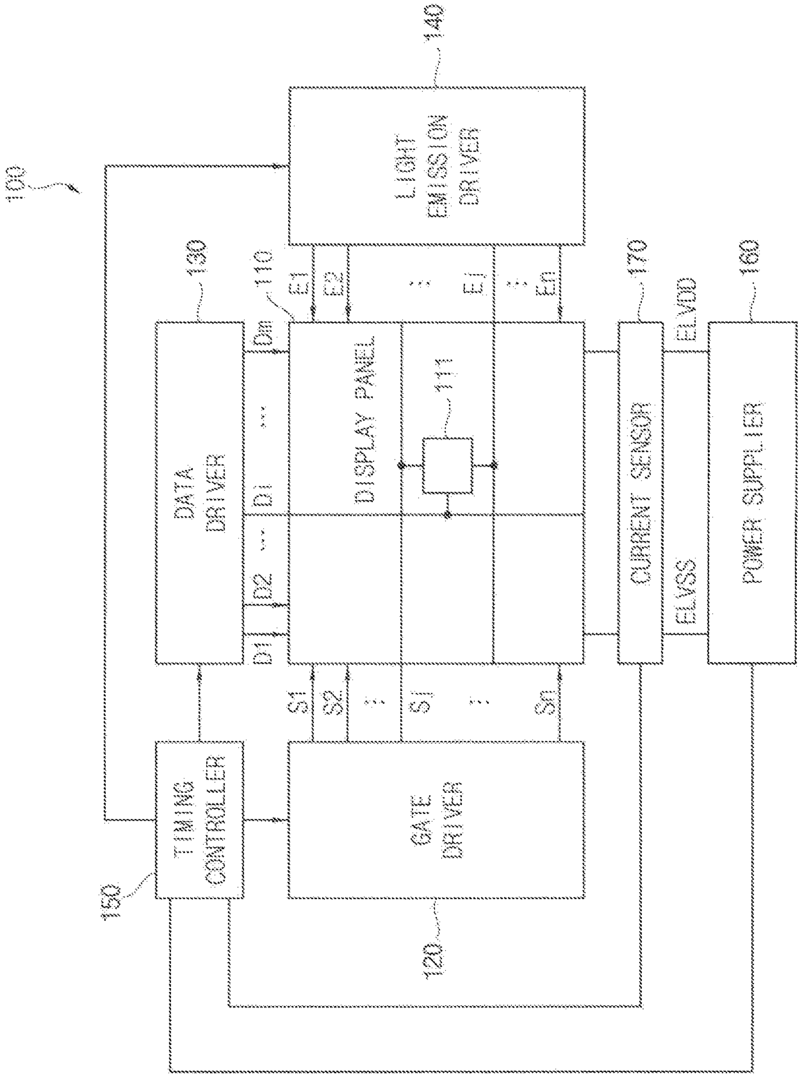
FIG. 1 is a block diagram illustrating a display device according to example embodiments.

Features of the inventive concept and methods of accomplishing the same may be understood more readily by reference to the following detailed description of embodiments and the accompanying drawings. Hereinafter, example embodiments will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof will not be repeated. In the drawings, the relative sizes of elements, layers, and regions may be exaggerated for clarity.

It will be understood that, although the terms “first,” “second,” “third,” etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

Spatially relative terms, such as “beneath,” “below,” “lower,” “under,” “above,” “upper,” and the like, may be used herein for ease of explanation to describe one element or feature’s relationship to another element(s) or feature(s)

as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element, layer, region, or component is referred to as being "on," "connected to," or "coupled to" another element, layer, region, or component, it can be directly on, connected to, or coupled to the other element, layer, region, or component, or one or more intervening elements, layers, regions, or components may be present. In addition, it will also be understood that when an element or layer is referred to as being "between" two elements or layers, it can be the only element or layer between the two elements or layers, or one or more intervening elements or layers may also be present.

In the following examples, the x-axis, the y-axis and the z-axis are not limited to three axes of a rectangular coordinate system, and may be interpreted in a broader sense. For example, the x-axis, the y-axis, and the z-axis may be perpendicular to one another, or may represent different directions that are not perpendicular to one another.

The terminology used herein is for the purpose of describing particular embodiments only and is not intended to be limiting of the present invention. As used herein, the singular forms "a," "an," and "the" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

When a certain embodiment may be implemented differently, a specific process order may be performed differently from the described order. For example, two consecutively described processes may be performed substantially at the same time or performed in an order opposite to the described order.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 is a block diagram illustrating a display device according to example embodiments.

Referring to FIG. 1, the display device 100 may include a display panel 110, a gate driver 120, a data driver 130, a light emission driver 140, a timing controller 150, and a power supply/power supplier 160. The display device 100 may display an image based on input image data provided from an external component. The display device 100 may be, for example, an organic light emitting display device.

The display panel 110 may include gate lines S1 through Sn, data lines D1 through Dm, light emission control lines E1 through En, and pixel 111, where each of m and n is an integer that is greater than or equal to 2. The pixel(s) 111 may be at respective crossing regions of the gate lines S1 through Sn, the data lines D1 through Dm, and the light emission control lines E1 through En.

The pixel 111 may store a data signal in response to a gate signal, and may emit light based on the stored data signal. A driving current flowing through the pixel 111 may be reduced according to a hysteresis characteristic of the pixel 111 (or, a hysteresis characteristic of a driving transistor included in the pixel 111). In this case, luminance of the display panel 110 may be reduced as the driving current is reduced. A configuration of the pixel 111 will be described in detail with reference to FIG. 2A.

The gate driver 120 may generate the gate signal based on the gate driving control signal, and may provide the gate signal to the pixel 111 through a respective one of the gate lines S1 through Sn (e.g., gate line Sj). Here, the gate driving control signal may be provided from the timing controller 150 to the gate driver 120, and may be determined/set based on a display period, or based on a driving frequency of the display device 100, where the display period may be a time interval between frames (e.g., an amount of time between two adjacent frame images) that are displayed through the display panel 110. For example, the display period may be 1 second (sec), or may be 1/60 sec, etc. For reference, the driving frequency may correspond to a number of the frames displayed during a certain time interval, and may be an inverse of the display period.

The gate driving control signal may include a start pulse and clock signals, and the gate driver 120 may include a shift register for sequentially generating the gate signal corresponding to the start pulse and the clock signals.

In some example embodiments, the gate driver 120 may operate in response to the driving frequency, which may be predetermined. However, the gate driver 120 may generate the gate signal with a certain period, which does not correspond to the driving frequency, based on a mask signal. For example, the gate driver 120 may operate in response to a driving frequency of 60 hertz (Hz), which corresponds to a display period of 1/60 sec. However, the gate driver 120 may generate and output a gate signal having a duration of only 1/60 sec for every second in response to the mask signal, where the mask signal has a logic low level for 1/60th of a second, and has a logic high level during 59/60 sec. In this case, the gate driver 120 may appear to operate with a driving frequency of 1 Hz (or, with a display period of 1 sec).

The data driver 130 may generate the data signal (or, a data voltage) based on data driving control signal and based on the input image data, and may provide the data signal to the pixel 111 through a corresponding one of the data lines D1 through Dm (e.g., data line Di). Here, the data driving control signal may be provided from the timing controller 150 to the data driver 130, and may be determined based on the display period, or the driving frequency, of the display device 100.

In some example embodiments, the data driver 130 may operate in response to the driving frequency, which may be predetermined, although the data driver 120 may generate the data signal with a certain period, which does not correspond to the driving frequency, based on the mask signal.

The light emission driver 140 (e.g., an emission driver, or an EM driver) may generate a light emission control signal based on the light emission driving control signal. Here, the light emission driving control signal may be provided from the timing controller 150 to the light emission driver 140, and may be determined based on the display period/the driving frequency of the display device 100. The light emission driver 140 may control an off-duty ratio (e.g., AOR, shown in FIGS. 5 and 6B) of the pixel 111 using the light emission control signal. Here, the off-duty ratio may be a ratio of light non-emission time of the pixel 111 to a light emission time of the pixel 111. For example, when the light emission time of the pixel 111 (e.g., a maximum time in which the pixel 111 is capable of emitting a light) is 8 milliseconds (ms), and when the light non-emission time of the pixel 111 is 4 ms, the off-duty ratio may be 50% (e.g., 4 ms:8 ms).

In some example embodiments, the light emission driver 140 may adjust/change/vary the off-duty ratio based on the light emission driving control signal, or based on the display period. The off-duty ratio may be determined according to an on-pixel ratio (OPR) of the input image data, grayscales, etc. Here, the on-pixel ratio may be a ratio of a number of pixels that are activated in an on-state, to a total number of all pixels. For example, the light emission driver 140 may gradually change the off-duty ratio during the display period. For example, when the off-duty ratio is 50% corresponding to a certain grayscale, the light emission driver 140 may gradually (or, step-by-step) change the off-duty ratio (e.g., from 50%, to sequentially be 40%, 30%, and 20% during the display period of 1 sec).

The timing controller 150 may control the gate driver 120, the data driver 130, the light emission driver 140, and the power supply 160. The timing controller 150 may generate the gate driving control signal, the data driving control signal, and a power control signal based on the display period.

In some example embodiments, the timing controller 150 may determine the display period based on the input image data. For example, the timing controller 150 may select one display period among a plurality of display periods based on the input image data, and may determine the display period as one selected among the plurality of display periods. For example, the timing controller 150 may determine whether an input image (e.g., an input image corresponding to the input image data) is a video, a still image, or a special image (e.g., an image of a watch). That is, the timing controller 150 may determine a type of the input image. According to a result of determining the type of the input image, the timing controller 150 may select one among the plurality of display periods. For example, the timing controller 150 may select a first display period (e.g., 1/60 sec) among the plurality of display periods when the input image is video, may select a second display period (e.g., 3 sec) among the plurality of display periods when the input image is the still image, and/or may select a third display period (e.g., 1 sec) among the plurality of display periods, which have different lengths, when the input image is the special image.

That is, the timing controller 150 may determine an operation mode of the display device 100 based on the input image data. Here, the operation mode may include a first operation mode having the first display period (e.g., 1/60 sec or 1/120 sec), and may include a second operation mode having the second display period (e.g., 1 sec or 0.5 sec) that is smaller than the first display period. The timing controller 150 may include a plurality of operation modes that respectively correspond to the plurality of display periods.

For example, the timing controller 150 may analyze a grayscale change of frames included in the input image data, and may determine that an input image is a still image when the grayscale change of the frames is less than a reference setting value, and may, therefore, select the second mode/second display period. For example, the timing controller 150 may calculate an on-pixel ratio of the input image data, may determine that an input image is a still image (or, a special image) when the on-pixel ratio of the input image data is less than a certain value, or is within a certain reference range, and may select the second operation mode or the second display period.

In some example embodiments, the display period may include a plurality of frame times, where a frame time is a unit time (or, a minimum time) to display one frame (or, a suitable time to display one frame). In this case, the timing controller 150 may generate a mask signal, which has a logic low level during a frame time among the plurality of frame times, and which has a logic high level during a remainder of frame time among the plurality of frame times. In addition, the timing controller 150 may generate the gate driving control signal and the data driving control signal based on the mask signal.

The power supply 160 may generate a power voltage, and may adjust/change/vary the power voltage during the display period based on the power control signal. Here, the power voltage may include a high power voltage ELVDD and a low power voltage ELVSS, and the high power voltage ELVDD may have a voltage level that is higher than a voltage level of the low power voltage ELVSS. For example, the power supply 160 may gradually reduce or lower the voltage level of the low power voltage ELVSS during the display period based on a first power control signal. Also, for example. The power supply 160 may gradually increase the voltage level of the high power voltage ELVDD during the display period based on a second power control signal.

In some example embodiments, the display device 100 may further include a current sensor 170. The current sensor 170 may measure a total current provided from the power supply 160 to the display panel 110. Here, the timing controller 150 may generate at least one of the light emission control signal and the power control signal based on a change of, or a variation of, the total current. For example, the display device 100 may measure the total current during a certain time (e.g., during the display period), may calculate a reduced ratio (e.g., a reduction factor, or a reduced amount) of the total current with time during the certain time/display period, and may store the reduced ratio of the total current. Here, the timing controller 150 may generate the at least one of the light emission control signal and the power control signal based on the reduced ratio of the total current.

For reference, a driving current that flows through the pixel 111 may be reduced according to a hysteresis characteristic of the pixel 111/of a driving transistor included in the pixel 111, and a luminance of the display panel 110 may be reduced according to reduction of the driving current.

Therefore, the display device 100 according to example embodiments may compensate or reduce the driving current of the pixel 111 by changing/adjusting the power voltage, and may compensate a luminance that is reduced during the display period. In addition, the display device 100 may compensate the luminance, which is reduced during the display period, by changing/adjusting the off-duty ratio/the emission time of the pixel 111 during the display period. Furthermore, the display device 100 may reduce or eliminate flicker due to a luminance that is periodically dropped/reduced then and recovered/restored.

Figure 2A:
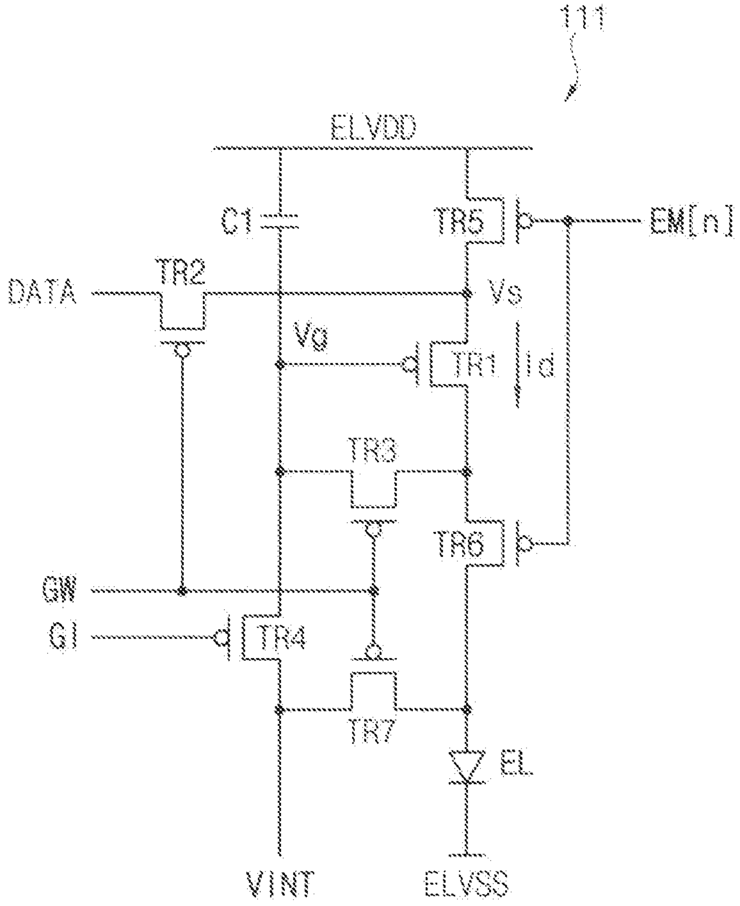
FIG. 2A is a circuit diagram illustrating an example of a pixel included in the display device of FIG. 1.

FIG. 2A is a circuit diagram illustrating an example of a pixel included in the display device of FIG. 1.

Referring to FIG. 2A, the pixel 111 may include first through seventh transistors TR1 through TR7, a first capacitor C1, and a light emission element EL.

The first transistor TR1, which may be referred to as a driving transistor, may be electrically connected between the high power voltage ELVDD and the light emission element EL, and may transfer a driving current Id to the light emission element EL based on a data signal DATA, or a data voltage, which is stored in the first capacitor C1.

The second transistor TR2 and the third transistor TR3 may transfer the data signal DATA to the first capacitor C1 based on a second gate signal GW. Here, the second gate signal GW may be the gate signal. The first capacitor C1 may store the data signal DATA.

The fourth transistor TR4 may transfer an initialization voltage VINT to the first capacitor C1 based on a first gate signal GI. In this case, the first capacitor C1 may be initialized by the initialization voltage VINT. The fifth transistor TR5 may be electrically connected between the high power voltage ELVDD and the first transistor TR1, and the sixth transistor TR6 may be electrically connected between the first transistor TR1 and the light emission element EL. The fifth transistor TR5 and the sixth transistor TR6 may form a current path (e.g., a flow path for the driving current Id) between the high power voltage ELVDD and the light emission element EL based on a light emission control signal EM[n].

The light emission element EL may be electrically connected between the first transistor TR1 (or the sixth transistor TR6) and the low power voltage ELVSS, and may emit a light based on the driving current Id. For example, the light emission element EL may be an organic light emitting diode. The seventh transistor TR7 may transfer the initialization voltage VINT to the light emission element EL based on the second gate signal GW. In this case, a threshold voltage of the light emission element EL may be compensated.

That is, the pixel 111 may initialize the first capacitor C1 based on the first gate signal GI, may store the data signal DATA in the first capacitor C1 based on the second gate signal GW, and may emit light with a luminance corresponding to the data signal DATA based on the light emission control signal EM[n].

However, the driving current Id that flows through the pixel 111 may be reduced over time according to a hysteresis characteristic, or a hysteresis curve, of the pixel 111, and a luminance of the display device 100 may be reduced according to reduction of the driving current Id.

The pixel 111 illustrated in FIG. 2A is exemplary. However, the pixel 111 is not limited thereto. For example, the pixel 111 may include an N-type circuit instead of a P-type circuit.

Figure 2B:
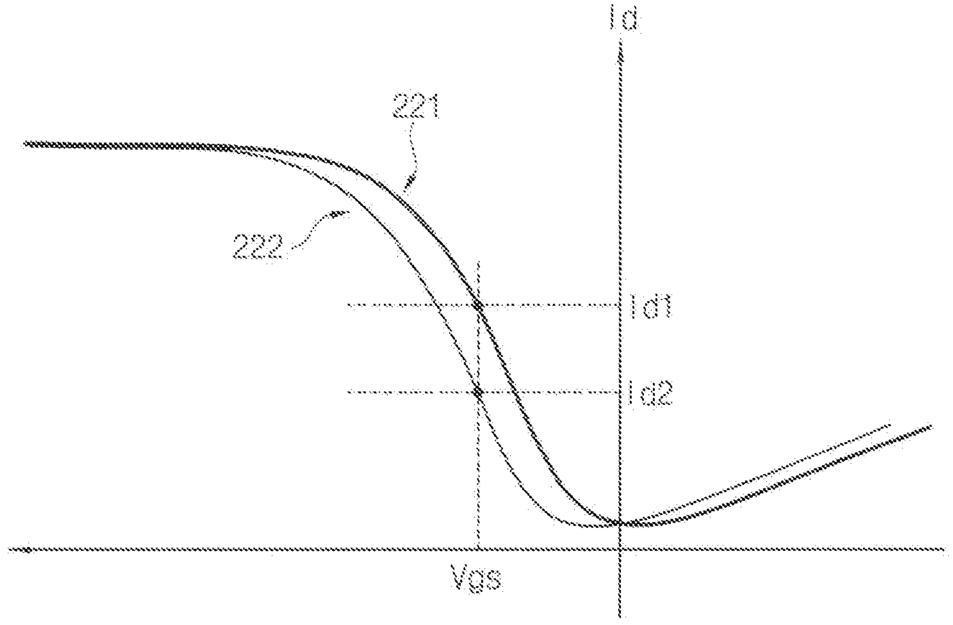
FIG. 2B is a diagram illustrating an example of a hysteresis characteristic of the pixel of FIG. 2A.

FIG. 2B is a diagram illustrating an example of a hysteresis characteristic of the pixel of FIG. 2A.

Referring to FIGS. 2A and 2B, the driving current Id that flows through the first transistor TR1 may be represented on a first curve 221 when the data signal DATA is applied to the first transistor TR1. For example, the driving current Id may have a first current amount Id1 based on a gate-to-source voltage Vgs of the first transistor TR1. However, when the data signal DATA is constantly applied to the first transistor TR1, a hole-trapping occurs in the first transistor TR1. In this case, the driving current Id may be represented on a second curve 222 according to the hole-trapping. For example, the driving current Id may have a second current amount Id2 based on the same gate-to-source voltage Vgs of the first transistor TR1. That is, when the data signal DATA is constantly applied to the first transistor TR1, a threshold voltage of the first transistor TR1 may be shifted to a negative direction, and the driving current Id may be reduced.

As described above, though the data signal DATA, which is constant with time, is applied to the pixel 111, a luminance drop may occur with time according to the hysteresis characteristic of the pixel 111.

Figure 3A:
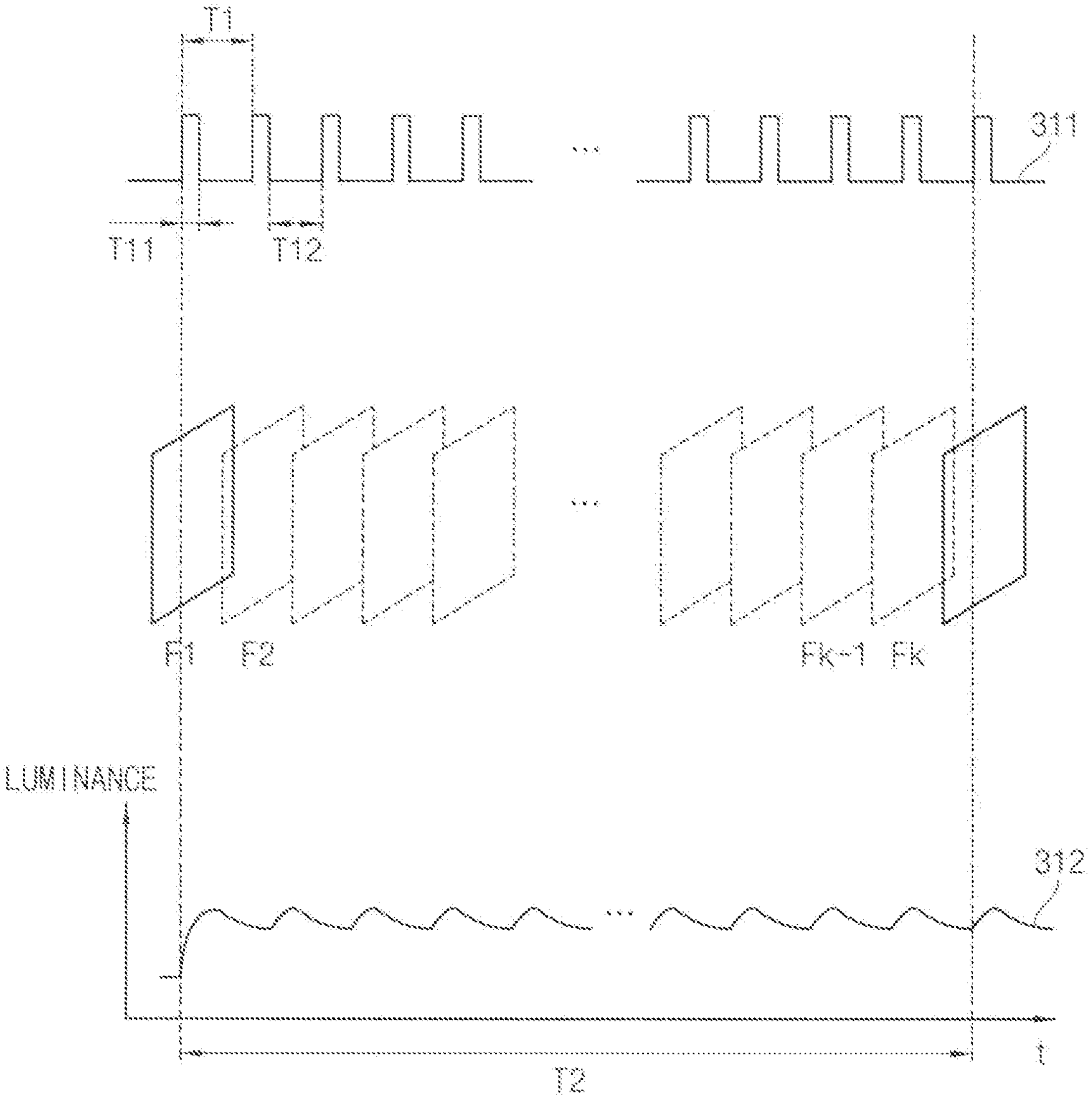
FIG. 3A is a diagram illustrating an example of a first driving mode of the display device of FIG. 1.

FIG. 3A is a diagram illustrating an example of a first driving mode of the display device of FIG. 1.

Referring to FIGS. 1 and 3A, the display device 100 may include a first mode/a first driving mode/a first operation mode, and may include a second mode/a second driving mode/a second operation mode. In the first mode, the display device 100 may operate with a first display period T1 (e.g., 1/60 sec). In the second mode, the display device 100 may operate with a second display period T2 (e.g., 1 sec).

A first waveform 311 illustrated in FIG. 3A may represent a waveform of the gate signal provided to the pixel 111 in the first mode. The gate signal may have a logic high level during a first time T11, and may have a logic low level during a second time T12. Here, the first time T11 and the second time T12 may be included in the first display period T1, and the first time T11 may be different from, or separate from, the second time T12.

In this case, the pixel 111 may receive the data signal DATA during the first time T11, and may emit light based on the data signal DATA during the second time T12. For example, the display device 100 may display sixty frames F1 through Fk during 1 sec based on the first display period T1 of 1/60 sec.

A first luminance 312 may increase/raise/refresh to be a target luminance during the first time T11 of the first waveform 311, and may drop during the second time T12. Here, a luminance drop rate (e.g., a rate of a luminance drop with respect to the target luminance) may be about 2%, although the drop in luminance might not be observed by a user.

Figure 3B:
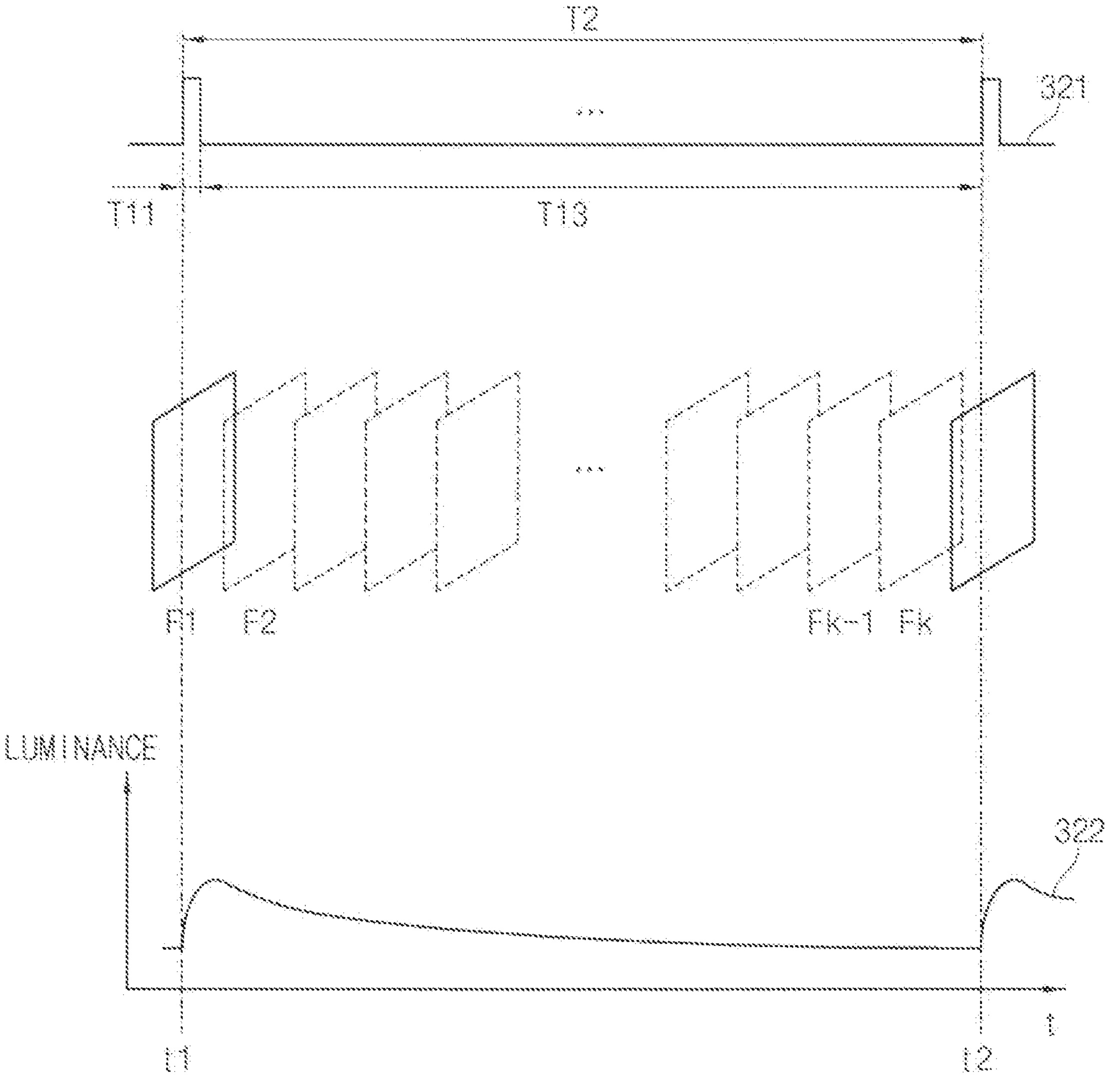
FIG. 3B is a diagram illustrating a comparison example of a second driving mode of the display device of FIG. 1.

FIG. 3B is a diagram illustrating a comparison example of a second driving mode of the display device of FIG. 1.

A second waveform 321 illustrated in FIG. 3B may represent the gate signal provided to the pixel 111 in the second mode. The gate signal may have a logic high level during the first time T11, and may have a logic low level during a third time T13. Here, the first time T11 and the third time T13 may be included in the second period T2, and the first time T11 may be different/separate from, or might not be overlapped with, the third time T13.

In this case, the pixel 111 may receive the data signal DATA during the first time T11, and may emit light during the third time T13 based on the data signal DATA. For example, the display device 100 may display one frame (e.g., a first frame F1) during the second display period T2 of 1 sec.

As the first time T11 is increased, or widened, the effects of the gate signal provided to the display panel 110 may be observed by a user. Therefore, the display device 100 may generate the gate signal illustrated in FIG. 3B by maintaining/keeping/using the gate signal during the first frame F1 illustrated in FIG. 3A, and by blocking the gate signal during all other frames F2 through Fk of the display period (e.g., frames F2 through Fk during third time T13). For example, the display device 100 may generate the gate signal based on the mask signal described with reference to FIG. 1.

As shown in FIG. 3B, second luminance 322 of the display device 100 may increase/raise/refresh to be a target luminance during the first time T11, and may drop/decrease during the third time T13. As the third time T13 is increased/widened, a luminance drop rate may correspondingly increase. For example, a luminance drop rate at a second time point t2 may be in a range of about 20% to about 60%. As the luminance drop rate increases, a luminance variation (e.g., a change of a luminance) may be observed by a user, and a flicker due to a cycle of luminance drop and recovery may be observed by a user. That is, a luminance drop and a flicker phenomenon may be observed by a user when the display device 100 operates/is driven in the second mode.

The display device 100 according to example embodiments may compensate a luminance, which is dropped during the display period, by changing at least one of the power voltage, the off-duty ratio, and/or a light non-emission time of the pixel 111. Therefore, the display device 100 may reduce a flicker (e.g., a flicker phenomenon) due to luminance being periodically dropped and recovered.

Figure 3C:
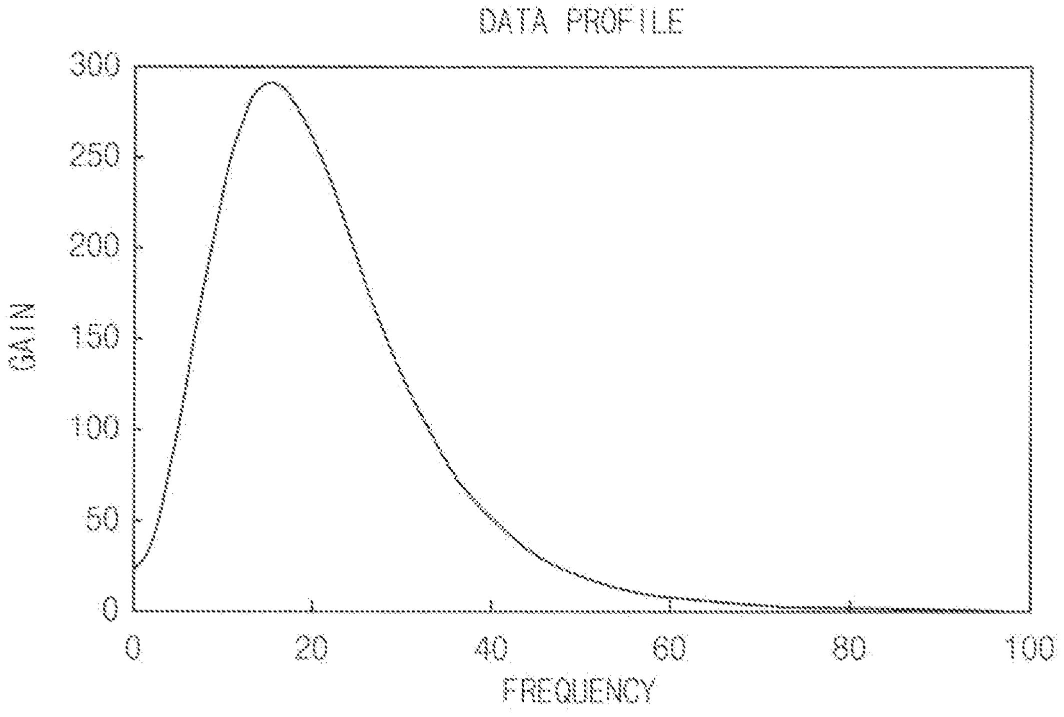
FIG. 3C is a diagram illustrating an example of a driving frequency-contrast sensitivity curve of the display device of FIG. 1.

FIG. 3C is a diagram illustrating an example of a driving frequency-contrast sensitivity curve of the display device of FIG. 1.

Referring to FIG. 3, a stimulus (e.g., a stimulus of a user, a sensitivity of a user to an image, a responsiveness of a user to the image, a gain) according to a change of a driving frequency is illustrated. The stimulus may be less than about 10 when the driving frequency of the display device 100 is about 60 Hz. As the driving frequency of the display device 100 is decreased, or as the display period of the display device 100 is increased, the stimulus may be larger. The stimulus may have a relatively greatest value (e.g., a maximum value) when the driving frequency is in a range of about 10 Hz through about 20 Hz. When the driving frequency is about 10 Hz or less, the stimulus may be reduced/decreased as the driving frequency becomes smaller.

The display device 100 according to example embodiments may determine/set a plurality of display periods based on a driving frequency-contrast sensitivity curve (e.g., based on a sensitivity of a user to an image for each of the display periods). For example, the display device 100 may set a first display period corresponding to a frequency of about 60 Hz, may set a second display period corresponding to a frequency of about 1 Hz, and may set a third display period corresponding to a frequency of about 20 Hz, and may store the first through third display periods that are set. For example, as described above, the first display period may be used to display a video, the second display period may be used to a still image, and the third display period may be used to display a special image.

As described above, the display device 100 may operate, or may be driven, in the first operation mode with the first display period, and in the second operation mode with the second display period. In addition, the first display period and the second display period may be set based on the driving frequency-contrast sensitivity curve.

Figure 4:
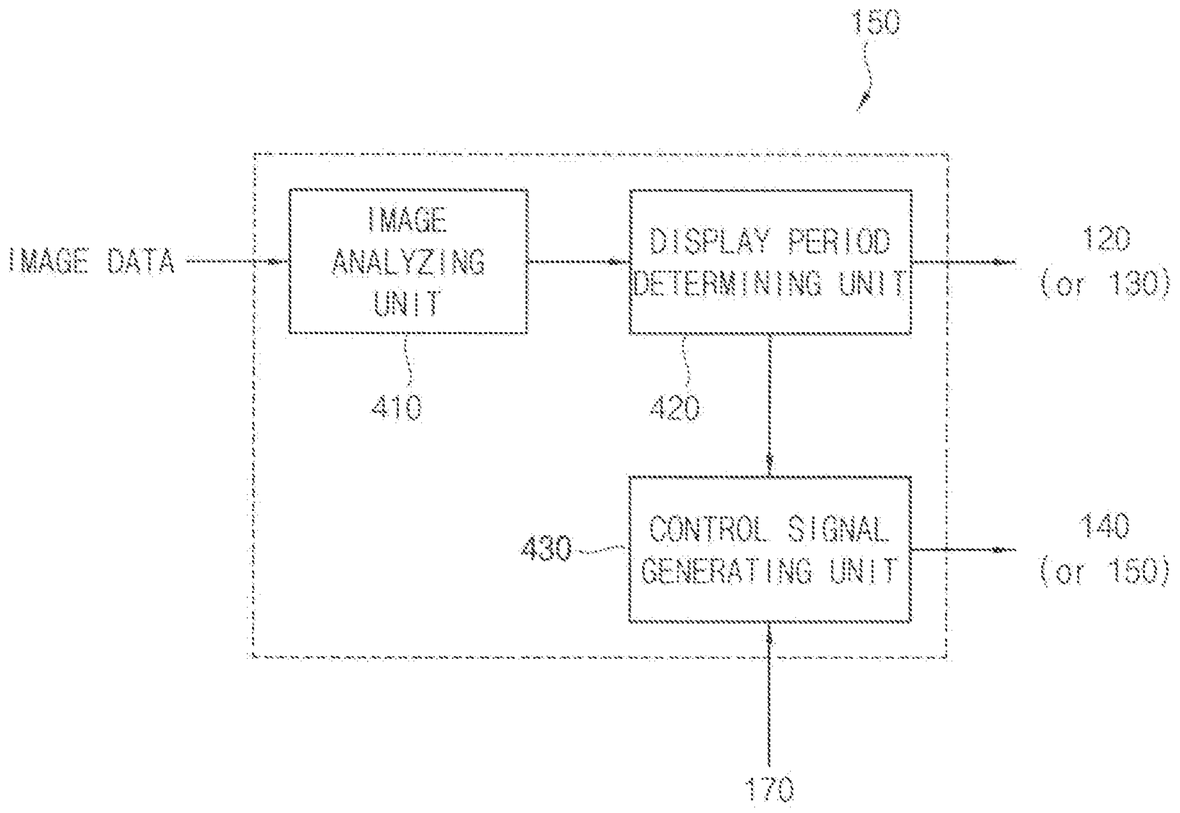
FIG. 4 is a block diagram illustrating an example of a timing controller included in the display device of FIG. 1.

FIG. 4 is a block diagram illustrating an example of a timing controller included in the display device of FIG. 1.

Referring to FIGS. 1 and 4, the timing controller 150 may include an image analyzing unit (e.g., an image analyzer) 410, a display period determining unit (e.g., a display period determiner) 420, and a control signal generating unit (e.g., a control signal generator) 430.

The image analyzing unit 410 may analyze the input image data IMAGE DATA, and may determine a type of an input image, or may determine an input image corresponding to the input image data IMAGE DATA. In some example embodiments, the image analyzing unit 410 may calculate a change of a grayscale value of the input image data IMAGE DATA during a certain time. Here, the certain time may be a time from a previous time point to a present time point, may be a time from the present time point to a future time point, or may be a time including the present time point. For example, the image analyzing unit 410 may calculate a change value of all of the grayscales (e.g., total grayscales) of the input image data IMAGE DATA during a certain time, and may determine that the input image is a still image when the change value of all of the grayscales is less than a certain value. For example, the image analyzing unit 410 may determine that the input image is a video when the change value of all of the grayscales is larger than a certain value (e.g., thereby indicating a number of different images). In some example embodiments, the image analyzing unit 410 may calculate an on-pixel ratio of the input image data IMAGE DATA, and may determine that the input image is a special image, or may determine that the input image is a still image, when the on-pixel ratio is less than a certain value, or is within a reference range.

The display period determining unit 420 may determine the display period based on a type of the input image. For example, the display period determining unit 420 may determine the display period as the first display period T1 (e.g., 1/60 sec) when the input image is a video. For example, the display period determining unit 420 may determine the display period as the second display period T2 (e.g., 3 sec) when the input image is a still image. For example, the display period determining unit 420 may determine the display period as the third display period T3 (e.g., 1 sec) when the input image is a special image (e.g., an image of a watch). Here, the display periods (or, values of the display periods) may be based on the stimulus/the stimulus of a user, as described with reference to FIG. 3C.

In some example embodiments, the display period determining unit 420 may determine the display period based on an externally provided selection signal (e.g., a selection signal provided from an external component). For example, the display period determining unit 420 may determine the display period as a fourth display period when the display period determining unit 420 determines that the fourth display period is selected by a user. That is, the display period determining unit 420 may determine the display period independently of an analysis result by the image analyzing unit 410.

In some example embodiments, the display period determining unit 420 may provide the display period, or data corresponding to the display period, to the gate driver 120 and the data driver 130. That is, the timing controller 150 may provide the display period to the gate driver 120 and the data driver 130 independently of the gate driving control signal and the data driving control signal. In this case, the gate driver 120 and the data driver 130 may be driven based on the display period.

In some example embodiments, the display period determining unit 420 may generate the mask signal, and may provide the mask signal to the gate driver 120 and the data driver 130 when the display period includes a plurality of frame times. Here, the mask signal may have a logic low level during one frame time among the plurality of frame times, and may have a logic high level during the rest frame time among the plurality of frame times. In this case, the gate driver 120 may provide the gate signal to the pixel 111 during one frame time, based on the mask signal, and may stop supplying, or may block a supply of, the gate signal during the remaining frame times. That is, the gate signal may be effectively provided to the pixel 111 during one frame time, and may be blocked during the rest frame times of a corresponding period. Similarly, the data driver 130 may provide the data signal to the pixel 111 during one frame time, and may stop supplying, or may block a supply of, the data signal to the pixel during the rest frame times.

The control signal generating unit 430 may generate the power control signal and/or the light emission driving control signal based on the display period.

In some example embodiments, the control signal generating unit 430 may generate the power control signal using a luminance profile, or using an information of luminance change/variance, which may be predetermined. Here, the luminance profile may include information of a luminance change with respect to time during the display period, and may be pre-stored in a memory device.

Figure 5:
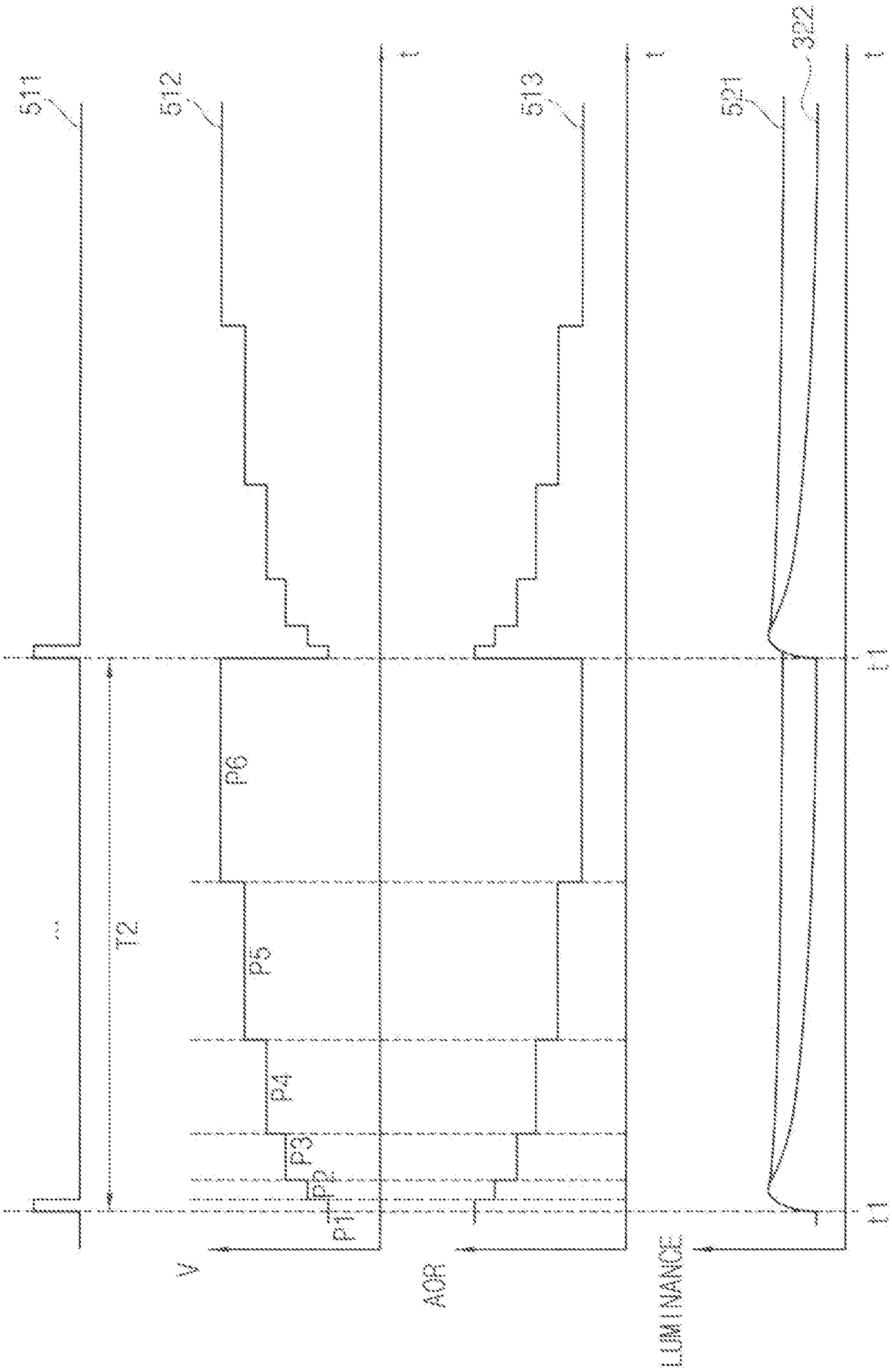
FIG. 5 is a waveform diagram illustrating an example of signals generated by the display device of FIG. 1.

FIG. 5 is a waveform diagram illustrating an example of signals generated by the display device of FIG. 1.

Referring to FIGS. 1, 3B, and 5, a third waveform 511 may represent the gate signal provided to the pixel 111 in the second mode. As described with reference to FIG. 3B, the display device 100 may operate with the second display period T2 (e.g., 1 sec) in the second mode. The third waveform 511 may be substantially the same as the second waveform 311 illustrated in FIG. 3B. Therefore, duplicated descriptions will be omitted.

A fourth waveform 512 may represent the power voltage generated by the power supply 160. For example, the fourth waveform 512 may represent a voltage corresponding to the high power voltage ELVDD, or may represent a voltage corresponding to the low power voltage ELVSS. The power supply 160 may generate the power voltage, which may increase gradually, or may increase step-by-step, during the second display period T2.

As illustrated in FIG. 5, the second display period T2 may include a plurality of periods P1 through P6. The second display period T2 may be divided into the plurality of periods P1 through P6 based on a corresponding voltage difference. For example, the second period P2 may have a first voltage difference with respect to the first period P1, and the third period P3 may have the first voltage difference with respect to the second period P2 (e.g., a difference in voltage from the first period P1 to the second period P2 may be the same as a difference in voltage from the second period P2 to the third period P3). That is, the power voltage may be gradually changed in a stepwise manner by the certain voltage difference.

A fifth waveform 513 may represent the light emission control signal generated by the light emission driver 140. That is, the fifth waveform 513 may represent a change of an off-duty ratio (AOR) of the pixel 111. The light emission driver 140 may generate the light emission control signal, which includes the off-duty ratio gradually changed during the second display period T2. Similar to a fourth waveform 512, the fifth waveform 513 may be gradually changed by a certain ratio.

That is, the display device 100 may generate a power control signal and a light emission driving control signal corresponding to a luminance drop during the second display period T2. Further, the power supply 160 may generate the power voltage, which is changed during the second display period P2 based on the power control signal, and the light emission driver 140 may generate the light emission control signal, which is changed during the second display period T2 based on the light emission driving control signal.

In this case, as illustrated in FIG. 5, a measured luminance 521 of the display device 100 may have a luminance drop, which is less than a luminance drop of a second luminance 322 illustrated in FIG. 3B (i.e., the measured luminance of the display device 100 may be compensated by changing of the power voltage V and changing of the off-duty ratio AOR). That is, a luminance drop and a flicker/a flicker phenomenon are reduced by periodically increasing and decreasing (e.g., compensating) luminance otherwise observed by a user, because the display device 100 compensates the luminance drop.

Figure 6A:
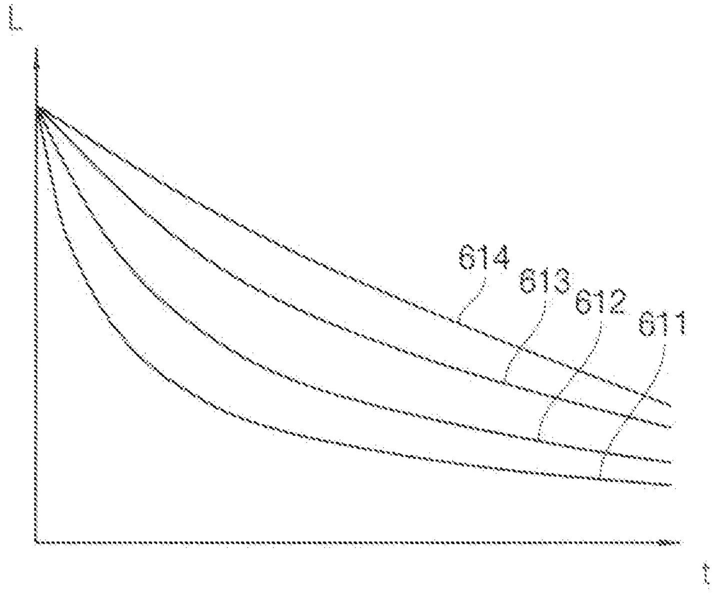
FIG. 6A is a diagram illustrating a luminance profile used by the timing controller of FIG. 4.
Figure 6B:
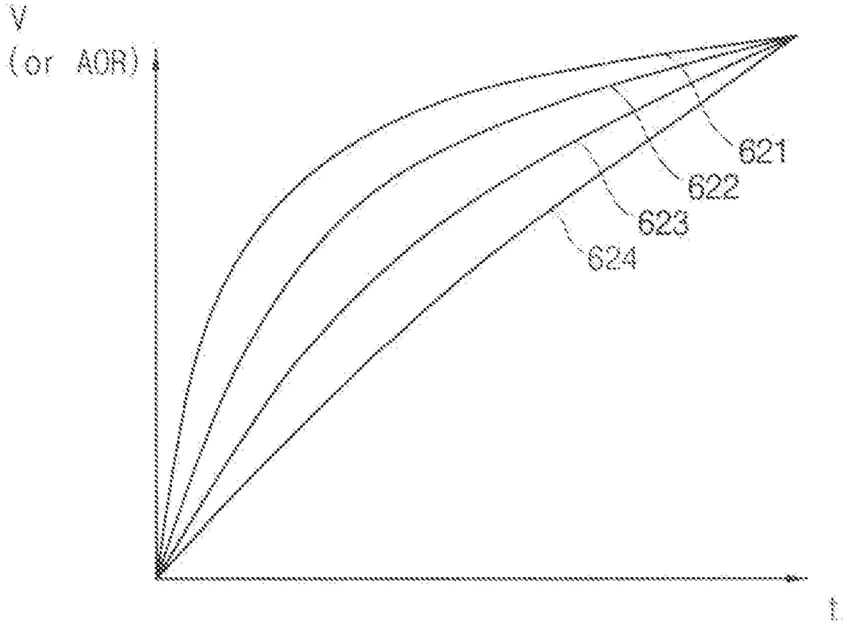
FIG. 6B is a diagram illustrating a power control signal generated by the timing controller of FIG. 4.

FIG. 6A is a diagram illustrating a luminance profile used by the timing controller of FIG. 4, and FIG. 6B is a diagram illustrating a power control signal generated by the timing controller of FIG. 4.

Referring to FIGS. 4, 6A, and 6B, the timing controller 150 may include luminance profiles 611, 612, 613, and 614. For example, the timing controller 150 includes two to four luminance profiles 611 through 614. The luminance profiles 611 through 614 may represent a difference luminance change.

In some example embodiments, the luminance profiles 611 through 614 may be predetermined/set for each of display periods. For example, a first luminance profile 611 may correspond to the first period T1 (e.g., 3 sec), and a second luminance profile 612 may correspond to the second period T2 (e.g., 1 sec). In this case, the timing controller 150 may select one of the luminance profiles 611 through 614 based on the display period, and may generate the power control signal and/or the light emission driving control signal based on the selected one of the luminance profiles 611 through 614.

In some example embodiments, the luminance profiles 611 through 614 may be determined/set for each of sub-pixels included in the pixel 111. For example, the first luminance profile 611 may represent a luminance change of a first sub-pixel that emits light with a first color (e.g., a red color). For example, the second luminance profile 612 may represent a luminance change of a second sub-pixel that emits light with a second color (e.g., a green color). For example, the third luminance profile 613 may represent a luminance change of a third sub-pixel that emits light with a third color (e.g., a blue color). For example, the fourth luminance profile 614 may represent a luminance change of a fourth sub-pixel that emits light with a fourth color (e.g., a white color). Here, the first through fourth sub-pixels may be included in the pixel 111. In this case, the timing controller 150 may generate the power control signal (e.g., first through fourth power control signals, or sub power control signals) for each of the sub-pixels.

The power supply 160 may generate and change the power voltage based on the power control signal. A first waveform 621 of the power voltage illustrated in FIG. 6B may correspond to the first luminance profile 611. Similarly, second through fourth waveforms 622 through 624 of the power voltage illustrated in FIG. 6B may respectively correspond to the second through fourth luminance profiles 622 through 624.

Figure 7:
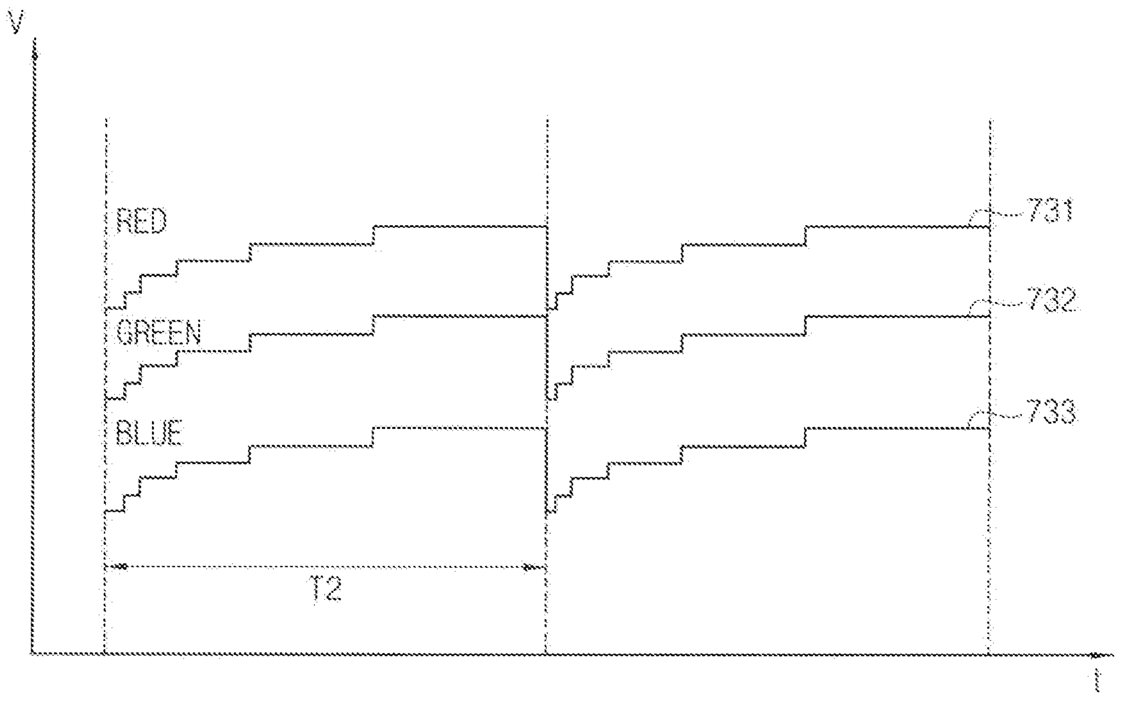
FIG. 7 is a diagram illustrating a power voltage generated by a power supply included in the display device of FIG. 1.

FIG. 7 is a diagram illustrating a power voltage generated by a power supply included in the display device of FIG. 1.

Referring to FIG. 7, the power supply 160 may generate the power voltage, or may generate sub power voltages, for each of sub-pixels included in the pixel 111. A first power voltage 731 may be a power voltage provided to a first sub-pixel (or, first sub-pixels,) which emits a light with a first color (e.g., a red color), a second power voltage 732 may be a power voltage provided to a second sub-pixel (or, second sub-pixels), which emits a light with a second color (e.g., a green color), and a third power voltage 733 may be a power voltage provided to a third sub-pixel (or, third sub-pixels), which emits a light with a third color (e.g., a blue color).

Because material efficiencies (or, material characteristics) of sub-pixels are different from each other, data signals/data voltages provided to the sub-pixels may be different from each other, and threshold voltage mobility of the sub-pixels (e.g., of the driving transistors included in the sub-pixels) may be different from each other. Therefore, chromaticity coordinates (of an input image) represented by the sub-pixels may be changed when the data signals are changed. The display device 100 according to example embodiments may compensate a change of the chromaticity coordinates by differently changing the power voltages for each of the sub-pixels.

As described with reference to FIGS. 6A, 6B, and 7, the display device 100 according to example embodiments may include the luminance profiles (e.g., sub luminance profiles), which may be predetermined and/or may change/adjust the power voltage based on a certain luminance profile corresponding to a display period. Similarly, the display device 100 may include profiles of off-duty ratios (AOR), which may be predetermined and/or may change/adjust an off-duty ratio based on a profile of the off-duty ratio corresponding to the display period.

Figure 8:
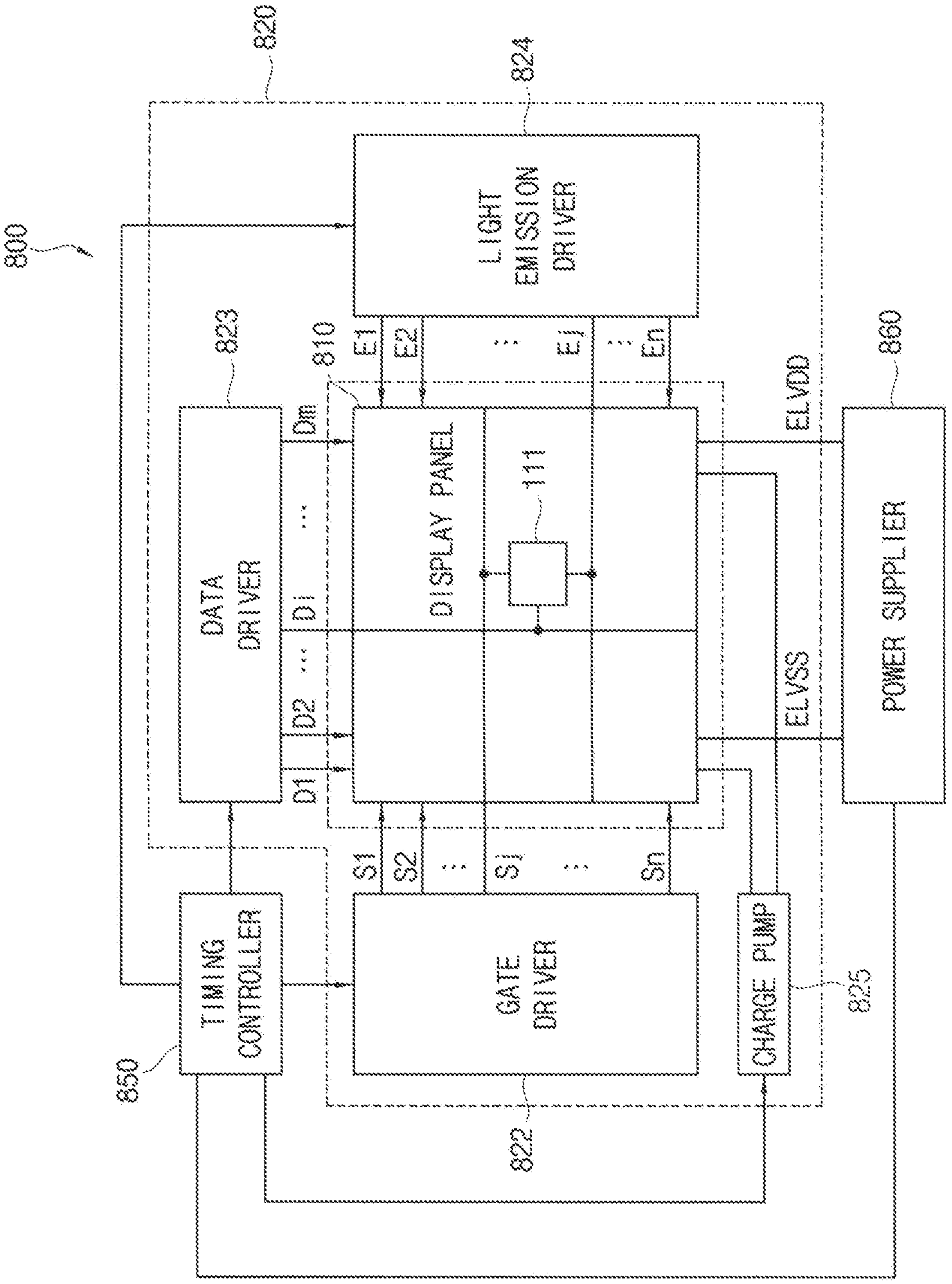
FIG. 8 is a block diagram illustrating a display device according to example embodiments.
Figure 9:
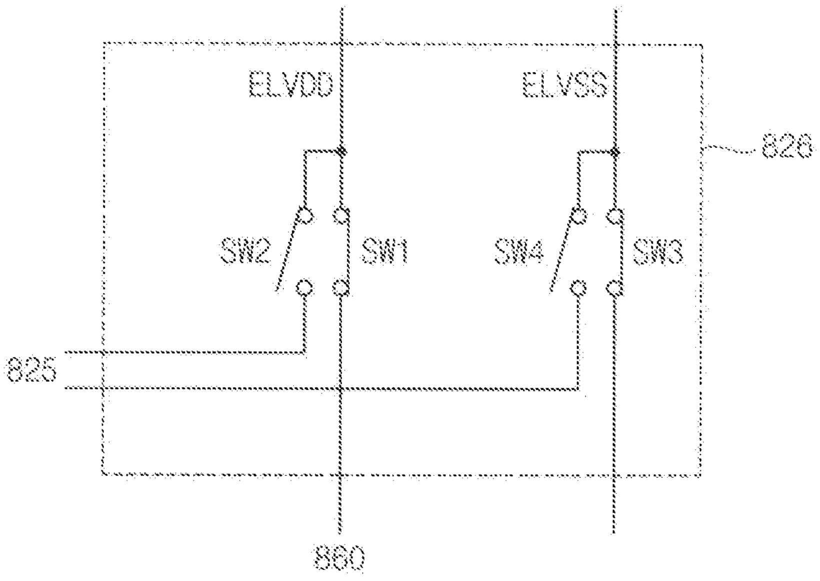
FIG. 9 is a diagram illustrating an example of a driving circuit included in the display device of FIG. 8.

FIG. 8 is a block diagram illustrating a display device according to example embodiments, and FIG. 9 is a diagram illustrating an example of a driving circuit included in the display device of FIG. 8.

Referring to FIG. 8, the display device 800 of the present embodiment may include a display panel 810, a driving circuit 820, a timing controller 850, and a power supply/power supplier 860. The display panel 810, the timing controller 850, and the power supply 860 may be substantially the same as the display panel 110, the timing controller 150, and the power supply 160 described with respect to FIG. 1, respectively. Therefore, duplicated descriptions will be omitted.

The driving circuit 820 may include a gate driver 822, a data driver 823, a light emission driver 824, and a charge pump (e.g., a charging pump unit) 825. Here, the gate driver 822, the data driver 823, and the light emission driver 824 may be substantially the same as the gate driver 120, the data driver 130, and the light emission driver 140 described with respect to FIG. 1, respectively.

The charge pump 825 may generate a driving voltage that drives the driving circuit 820 based on an external voltage that is provided from outside, or from an external component. The charge pump 825 may generate a secondary power voltage (or, an auxiliary power voltage), which may be changed with time in response to a second power control signal. Here, the second power control signal may be generated by the timing controller 850.

In some example embodiments, the driving circuit 820 may include a power selection unit 826 (see FIG. 9) that connects the charge pump 825 and a power line from the power supply 860 based on a switch control signal.

As illustrated in FIG. 9, the driving circuit 820 may include a power selection unit 826. The power selection unit 826 may include a first switch SW1 to connect a first power line with the power supply 860, and a second switch SW2 to connect the first power line with the charge pump 825. Here, the first power line may transfer the high power voltage ELVDD. The power selection unit 826 may include a third switch SW3 to connect a second power line with the power supply 860, and may include a fourth switch SW4 to connect the second power line with the charge pump 825. Here, the second power line may transfer the low power voltage ELVSS.

The first switch SW1 may be turned off, and the second switch may be turned on, in response to a first switch control signal. Here, the first switch control signal may be generated by the timing controller 820. For example, the timing controller 820 may generate the first switch control signal when the display device 800 determines that an input image is a still image.

That is, the driving circuit 820 may select a power voltage generated by the power supply 860, or may select a secondary power voltage generated by the driving circuit 820, and may provide the display panel 810 with the selected power voltage or the selected secondary power voltage.

In FIG. 9, the first switch SW1 and the second switch SW2 are arranged independently to each other, and are included in the driving circuit 820. However, the first switch SW1 and the second switch SW2 are not limited thereto. For example, the first switch SW1 and the second switch SW2 may be implemented as one switch that connects the first power line with the power supply 860, or with the driving circuit 820, in response to a switch control signal. For example, the first switch SW1 and the second switch SW2 may be included in the display panel 810.

For reference, power consumption to output a data signal may account for most of the total power consumption of the driving circuit 820. When the display device 800 is driven with a relatively large display period (or, driven with an ultra-low frequency, e.g., 1 Hz), an output frequency of the data signal may be reduced, and the total power consumption may be reduced. Therefore, the display device 800 may provide a power voltage (or, may provide a secondary power voltage) to the display panel 810 using the driving circuit 820. In this case, the display device 800 may control a configuration of changing the power voltage by using the driving circuit 820, which may be more easily performed than controlling a configuration of changing a power voltage of an externally located power supply 860. In addition, the power consumption will be reduced because operation of the power supply 860 is reduced or minimized.

As described above, the display device 800 according to example embodiments may generate a secondary power voltage, which is different from a power voltage generated by the power supply 860, and may provide the display panel 810 with one selected among the power voltage and the secondary power voltage based on a selected/determined display period. The display device 800 may control the secondary power voltage more easily than the power voltage generated by the power supply 860, and may reduce power consumption by generating the secondary power voltage using the driving circuit 820.

The present inventive concept may be applied to any display device (e.g., an organic light emitting display device, a liquid crystal display device, etc.). For example, the present inventive concept may be applied to a television, a computer monitor, a laptop, a digital camera, a cellular phone, a smart phone, a personal digital assistant (PDA), a portable multimedia player (PMP), an MP3 player, a navigation system, a video phone, etc.

The foregoing is illustrative of example embodiments, and is not to be construed as limiting thereof. Although a few example embodiments have been described, those skilled in the art will readily appreciate that many modifications are possible in the example embodiments without materially departing from the novel teachings and advantages of example embodiments. Accordingly, all such modifications are intended to be included within the scope of example embodiments as defined in the claims. In the claims, means-plus-function clauses are intended to cover the structures described herein as performing the recited function and not only structural equivalents but also equivalent structures. Therefore, it is to be understood that the foregoing is illustrative of example embodiments and is not to be construed as limited to the specific embodiments disclosed, and that modifications to the disclosed example embodiments, as well as other example embodiments, are intended to be included within the scope of the appended claims. The inventive concept is defined by the following claims, with equivalents of the claims to be included therein.

What is claimed is:

1. A driving circuit for driving a display panel comprising a gate line, a data line, a first power line, a second power line, and a pixel connected to the gate line, the data line, the first power line, and the second power line, the driving circuit comprising:

a gate driver configured to provide a gate signal to the pixel through the gate line;

a data driver configured to provide a data signal to the pixel through the data line;

a charging pump unit configured to generate a first secondary power voltage and a second secondary power voltage lower than the first secondary power voltage to be adjusted with time during a display period representing a time interval of frames; and a power selecting unit configured to connect the first power line and the second power line to the charging pump unit or a power supply configured to generate a first power voltage and a second power voltage lower than the first power voltage.

2. The driving circuit of claim 1, further comprising:

a light emission driver configured to provide a light emission control signal to the pixel through a light emission control line connected to the pixel.

3. The driving circuit of claim 1, wherein, when the first power line is connected to the power supply, the first power voltage is provided to the pixel through the first power line, and wherein, when the first power line is connected to the charging pump unit, the first secondary power voltage is provided to the pixel through the first power line.

4. The driving circuit of claim 1, wherein, when the second power line is connected to the power supply, the second power voltage is provided to the pixel through the second power line, and wherein, when the second power line is connected to the charging pump unit, the second secondary power voltage is provided to the pixel through the second power line.

5. The driving circuit of claim 1, wherein the power selecting unit comprises:

a first switch configured to turn on or off between the power supply and the first power line;

a second switch configured to turn on or off between the charging pump unit and the first power line;

a third switch configured to turn on or off between the power supply and the second power line; and a fourth switch configured to turn on or off between the charging pump unit and the second power line.

6. The driving circuit of claim 5, wherein turn-on-off operations of the first, second, third, and fourth switches are determined based on the display period representing the time interval of frames.

7. The driving circuit of claim 6, wherein, when the first switch turns on and the second switch turns off, the first power voltage is provided to the pixel through the first power line, wherein, when the first switch turns off and the second switch turns on, the first secondary power voltage is provided to the pixel through the first power line, wherein, when the third switch turns on and the fourth switch turns off, the second power voltage is provided to the pixel through the second power line, and wherein, when the third switch turns off and the fourth switch turns on, the second secondary power voltage is provided to the pixel through the second power line.

8. The driving circuit of claim 7, wherein, when an input image is determined as a still image, the first and third switches turn off, and the second and fourth switches turn on, and wherein, when the input image is not determined as the still image, the first and third switches turn on, and the second and fourth switches turn off.

9. A display device comprising:

a display panel comprising a gate line, a data line, a first power line, a second power line, and a pixel connected to the gate line, the data line, the first power line, and the second power line;

a timing controller configured to generate a gate driving control signal, a data driving control signal, a power control signal, and a switch control signal based on a display period representing a time interval of frames;

a gate driver configured to provide a gate signal to the pixel through the gate line based on the gate driving control signal;

a data driver configured to provide a data signal to the pixel through the data line based on the data driving control signal;

a power supply that generates a first power voltage and a second power voltage lower than the first power voltage;

a charging pump unit configured to generate a first secondary power voltage and a second secondary power voltage lower than the first secondary power voltage to be adjusted with time during the display period based on the power control signal; and a power selecting unit configured to connect the first power line and the second power line to the charging pump unit or the power supply based on the switch control signal.

10. The display device of claim 9, further comprising:

a light emission driver configured to provide a light emission control signal to the pixel through a light emission control line connected to the pixel.

11. The display device of claim 9, wherein, when the power selecting unit connects the first power line to the power supply, the first power voltage is provided to the pixel through the first power line, and wherein, when the power selecting unit connects the first power line to the charging pump unit, the first secondary power voltage is provided to the pixel through the first power line.

12. The display device of claim 9, wherein, when the power selecting unit connects the second power line to the power supply, the second power voltage is provided to the pixel through the second power line, and wherein, when the power selecting unit connects the second power line to the charging pump unit, the second secondary power voltage is provided to the pixel through the second power line.

13. The display device of claim 9, wherein the power selecting unit comprises:

a first switch configured to turn on or off between the power supply and the first power line based on the switch control signal;

a second switch configured to turn on or off between the charging pump unit and the first power line based on the switch control signal;

a third switch configured to turn on or off between the power supply and the second power line based on the switch control signal; and a fourth switch configured to turn on or off between the charging pump unit and the second power line based on the switch control signal.

14. The display device of claim 13, wherein, when the first switch turns on and the second switch turns off based on the switch control signal, the first power voltage is provided to the pixel through the first power line, wherein, when the first switch turns off and the second switch turns on based on the switch control signal, the first secondary power voltage is provided to the pixel through the first power line, wherein, when the third switch turns on and the fourth switch turns off based on the switch control signal, the second power voltage is provided to the pixel through the second power line, and wherein, when the third switch turns off and the fourth switch turns on based on the switch control signal, the second secondary power voltage is provided to the pixel through the second power line.

15. The display device of claim 14, wherein, when an input image is determined as a still image, the switch control signal controls the first and third switches to turn off and controls the second and fourth switches to turn on, and wherein, when the input image is not determined as the still image, the switch control signal controls the first and third switches to turn on and controls the second and fourth switches to turn off.

* * * * *